(12) United States Patent
Mansoorian et al.

(10) Patent No.: US 6,480,921 B1
(45) Date of Patent: Nov. 12, 2002

(54) REDUCING INTERNAL BUS SPEED IN A BUS SYSTEM WITHOUT REDUCING READOUT RATE

(75) Inventors: Barmak Mansoorian, Los Angeles, CA (US); Scott Yee, Taipei (TW); Roger Panicacci, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/359,068

(22) Filed: Jul. 21, 1999

Related U.S. Application Data
(60) Provisional application No. 60/093,836, filed on Jul. 22, 1998.

(51) Int. Cl.[7] .......................... G06F 13/00; H04L 12/50; H04Q 11/00
(52) U.S. Cl. .......................... 710/305; 710/52; 710/316; 370/386
(58) Field of Search .................................. 710/305, 313, 710/52, 62, 316; 370/438, 386, 360, 912, 388, 398, 465, 429; 709/232, 238, 253; 340/2.2, 2.28; 250/208.1; 348/294, 281, 207; 358/448, 909.1; 345/418

(56) References Cited

U.S. PATENT DOCUMENTS

| | | | | |
|---|---|---|---|---|
| 5,113,390 A | * | 5/1992 | Hayashi et al. | |
| 5,237,565 A | * | 8/1993 | Henrion et al. | |
| 5,420,855 A | * | 5/1995 | Morimoto et al. | |
| 5,487,155 A | * | 1/1996 | Drewry et al. | |
| 5,517,619 A | * | 5/1996 | Muramatsu et al. | |
| 6,009,092 A | * | 12/1999 | Basilico | |
| 6,188,686 B1 | * | 2/2001 | Smith | |

* cited by examiner

Primary Examiner—Gopal C. Ray
(74) Attorney, Agent, or Firm—Fish & Richardson P.C.

(57) ABSTRACT

An improved bus system having input ports and output ports for transporting data is described. The bus system includes bus lines, switching elements, and a sequencing element. The bus lines channel data from the input ports to the output ports. The switching elements are configured to place data from the input ports onto the bus lines. Each of the switching elements enable one of a group of data to be placed on each of the bus lines simultaneously. The sequencing element selects a predetermined number of the group of data on the bus lines and sequentially directs the selected number of data to the output ports at different points in time.

21 Claims, 10 Drawing Sheets

|  | T = 0 | T = 13.5 nS | T = 27 nS | T = 40.5 nS | T = 54 nS | |
|---|---|---|---|---|---|---|
| Port A | Column 1 | Column 5 | Column 9 | Column 13 | Column 17 | ..... |
| Port B | Column 2 | Column 6 | Column 10 | Column 14 | Column 18 | ..... |
| Port C | Column 3 | Column 7 | Column 11 | Column 15 | Column 19 | ..... |
| Port D | Column 4 | Column 8 | Column 12 | Column 16 | Column 20 | ..... |

FIG. 4B

REDUCING INTERNAL BUS SPEED IN A BUS SYSTEM WITHOUT REDUCING READOUT RATE

CROSS-REFERENCE TO RELATED APPLICATIONS

This application claims benefit of the priority of U.S. Provisional Application Ser. No. 60/093,836, filed Jul. 22, 1998 and entitled "Multiport APS Output".

BACKGROUND

The present specification generally relates to a bus system and particularly to a high-speed data transfer system.

A bus is an electrical channel that interconnects two or more devices. The bus channel includes a number of wires that can perform at least one of data transfer, timing and synchronization, and bus arbitration. Digital buses inside a computer carry either data or addresses of memory cells. However, the digital bus encounters a scaling problem as the number of connections to the bus increases.

Digital imaging devices, such as active pixel sensor (APS) cameras, include many image sensors arranged into arrays of columns and rows. Each image sensor collects electrical charge when exposed to light. Control signals are provided to the image sensors to enable the sensors to periodically transfer the collected charges to analog-to-digital converters (ADCs). The converted digital data are then stored in the column-parallel ADC registers.

A single serial bus is used to carry column-parallel sensor data stored in the ADC registers to the output port. For an image sensor with an array of 1280×720 pixels, there are 1280 columns per row and can be as many connections to the serial bus. Therefore, the internal bus speed, and hence the readout rate, must be very high in order to transfer an entire array of pixel data or frame in less than 1/60 of a second.

SUMMARY

The inventors noticed that by replacing the single serial bus with several parallel buses and sequentially directing data placed on the parallel buses to output ports at high speed, internal bus speed can be reduced without reducing the readout rate. Furthermore, the addition of parallel buses enables the number of connections to each bus to be reduced. This can reduce parasitic capacitance and lower the input loads on the bus lines.

In one aspect, the present specification involves transportation of data by a bus system having input ports and output ports. The bus system includes bus lines, switching elements, and a sequencing element.

The bus lines channel data from the input ports to the output ports. The switching elements are configured to place data from the input ports onto the bus lines. Each of the switching elements enable part of a group of data to be placed on each of the bus lines simultaneously. The sequencing element selects a part, e.g. predetermined number of the group of data on the bus lines, and sequentially directs the selected number of data to the output ports at different points in time.

The bus system also includes buffering elements connected to the bus lines and the sequencing element. The buffering elements buffer the current data placed on the bus lines and allow the switching elements to place the next group of data onto the bus lines while the sequencing element is directing the previous group of data to the output ports.

In some embodiments, eight bus lines channel data from the input ports to the output ports. In addition, eight switching elements allow eight data packets from the input ports to be placed simultaneously on the eight bus lines. The sequencing element includes two multiplexers. Each multiplexer is coupled to four of the eight bus lines and has an output port. The multiplexer is configured to select data on one of the four bus lines. It sequentially directs the selected data to the output port at different points in time.

In another embodiment, there are sixteen bus lines channeling data from the input ports to the output ports. In addition, sixteen switching elements allow sixteen data packets from the input ports to be placed simultaneously on the sixteen bus lines. The sequencing element selects the data on four bus lines during one time slot to sequentially direct the selected data to the four output ports.

In another aspect, an active pixel sensor (APS) system having output ports is disclosed. The APS system includes a pixel sensor array, a row-select element, an array of ADC registers, and a bus system.

The pixel sensor array is arranged in an array of rows and columns. The array is configured to form an electrical representation of an image being sensed. The row-select element is configured to select a row of pixel sensors. The array of ADC registers converts electrical charges sensed by the row of pixel sensors to digital pixel data and stores them in the registers. The bus system is configured to transfer pixel data from the array of ADC registers to the output ports. The APS system also includes a timing and control unit configured to generate timing and control signals that select appropriate pixel data and transfer the data to the output ports.

In another aspect, an APS camera system for converting an array of pixel data to a visual image is disclosed. The camera system includes all of the elements in the APS system and an image display device. The display device arranges the pixel data from the bus output ports in sequential order of rows to display the visual image on the display screen.

In a further aspect, a microcomputer system is disclosed. The system includes a central processing unit, a memory device, a bus system, and a peripheral devices. The central processing unit is configured to control and process various data. The memory device is connected to the central processing unit and is configured to supply the central processing unit with processing data. The bus system transfers the processed data from the central processing unit to bus output ports. The peripheral devices transfer the processed data from the bus output ports to the peripheral devices for various different operations.

The details of one or more embodiments are set forth in the accompanying drawings and the description below. Other embodiments and advantages will become apparent from the following description and drawings, and from the claims.

BRIEF DESCRIPTION OF THE DRAWINGS

These and other aspects will be described in reference to the accompanying drawings wherein:

FIG. 4B is a timing sequence of the multiplexed pixel data in a tabulate format;

Like reference numbers and designations in the various drawings indicate like elements.

DETAILED DESCRIPTION

Figure 1:
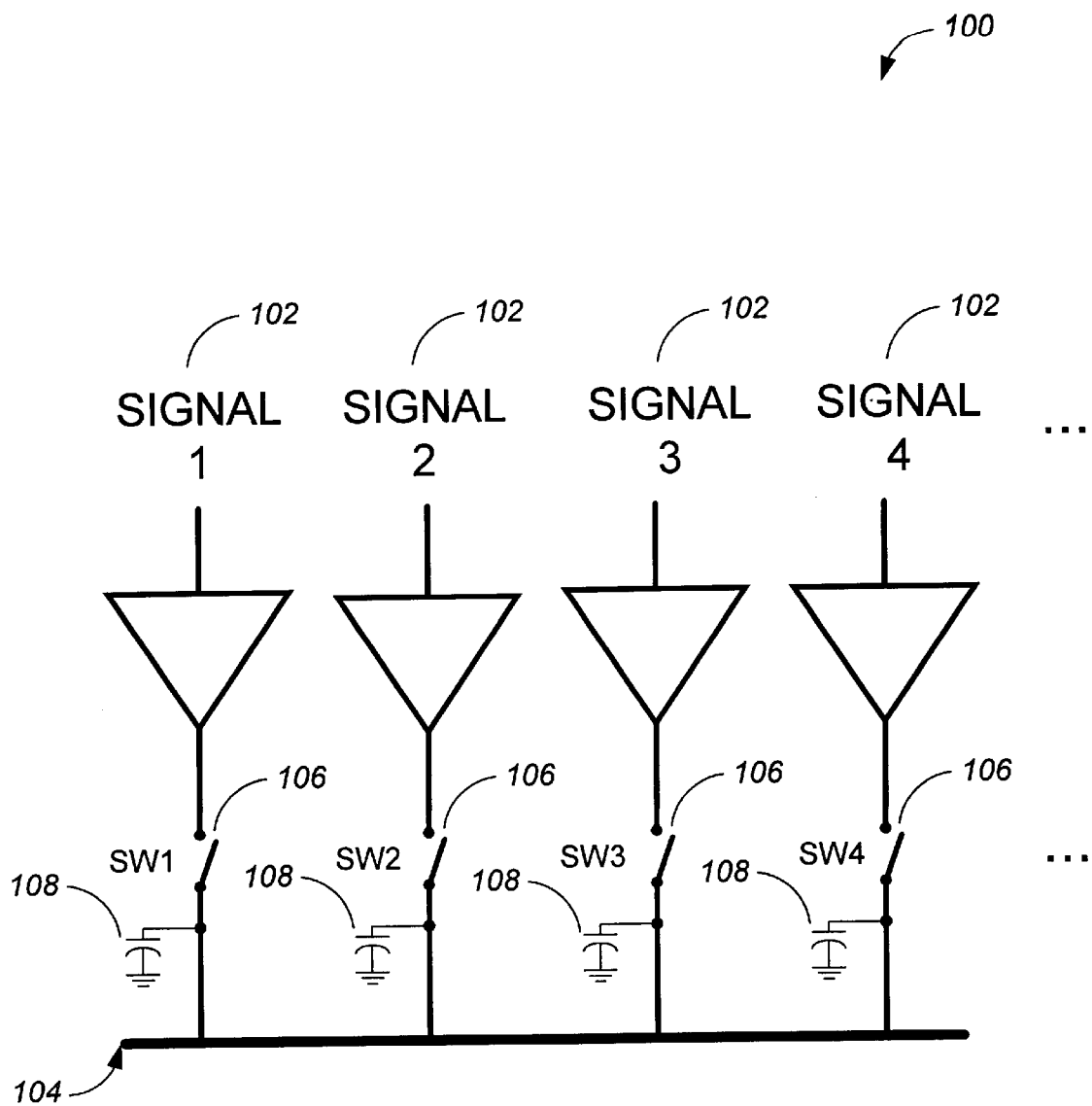
FIG. 1 is a conventional bus system for transferring data from a digital image sensor.

A conventional bus system 100 for transferring data from a digital image sensor, such as an active pixel sensor (APS), is shown in FIG. 1. The signals 102 from the sensor are placed on a serial bus 104 by energizing the corresponding switches 106, which can be implemented with transistors. Each switch 106 connection added to the bus 104 creates an additional parasitic capacitance 108. Thus, each active signal 102 tied to the bus 104 experiences a large input load of the sum of the parasitic capacitances 108 of all of the other sources.

Figure 2:
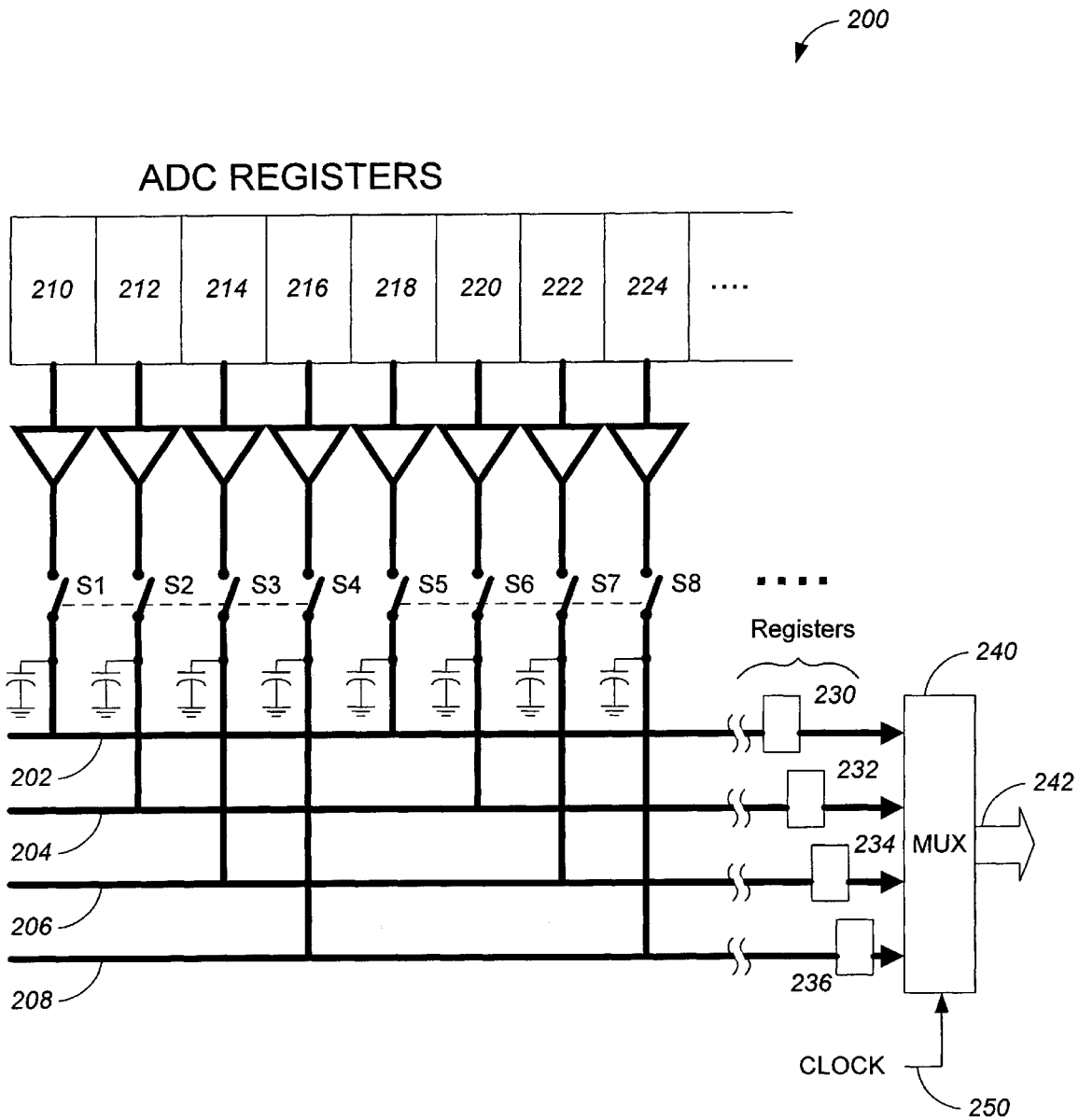
FIG. 2 is one aspect of the improved bus system.

FIG. 2 shows one aspect of the improved bus system 200. The single serial bus 104 of the conventional system is replaced with several parallel buses 202, 204, 206, 208. The digital data 210, 212, 214, 216 are simultaneously placed on separate bus lines and are latched into registers 230, 232, 234, 236. The latched data are then passed onto a multiplexer 240 for outputting data at an output port 242. The digital data passing through the multiplexer 240 are read out to the output port 242 at higher s speed than the speed of the separate internal bus lines 202, 204, 206, 208. In addition, the input load experienced by the active signals due to reduction in parasitic capacitance is significantly reduced.

In the aspect shown in FIG. 2, there are four parallel bus lines 202, 204, 206, 208 channeling data to the output port 242 at a higher speed than that of the conventional bus system 100. The data signals 210, 212, 214, 216 are placed on the bus lines 202, 204, 206, 208, respectively. All data are transferred to the bus lines at the same time by configuring the switches S1 through S4 to operate simultaneously. The switches S5 through S8 enable data signals 218, 220, 222, 224 to be placed on the bus lines 202, 204, 206, 208, respectively, on the next clock 250 cycle, and so on.

This configuration reduces the parasitic capacitance and allows each bus line 202, 204, 206, 208 to operate at slower speed than the actual pixel output rate at the output port 242.

Figure 3:
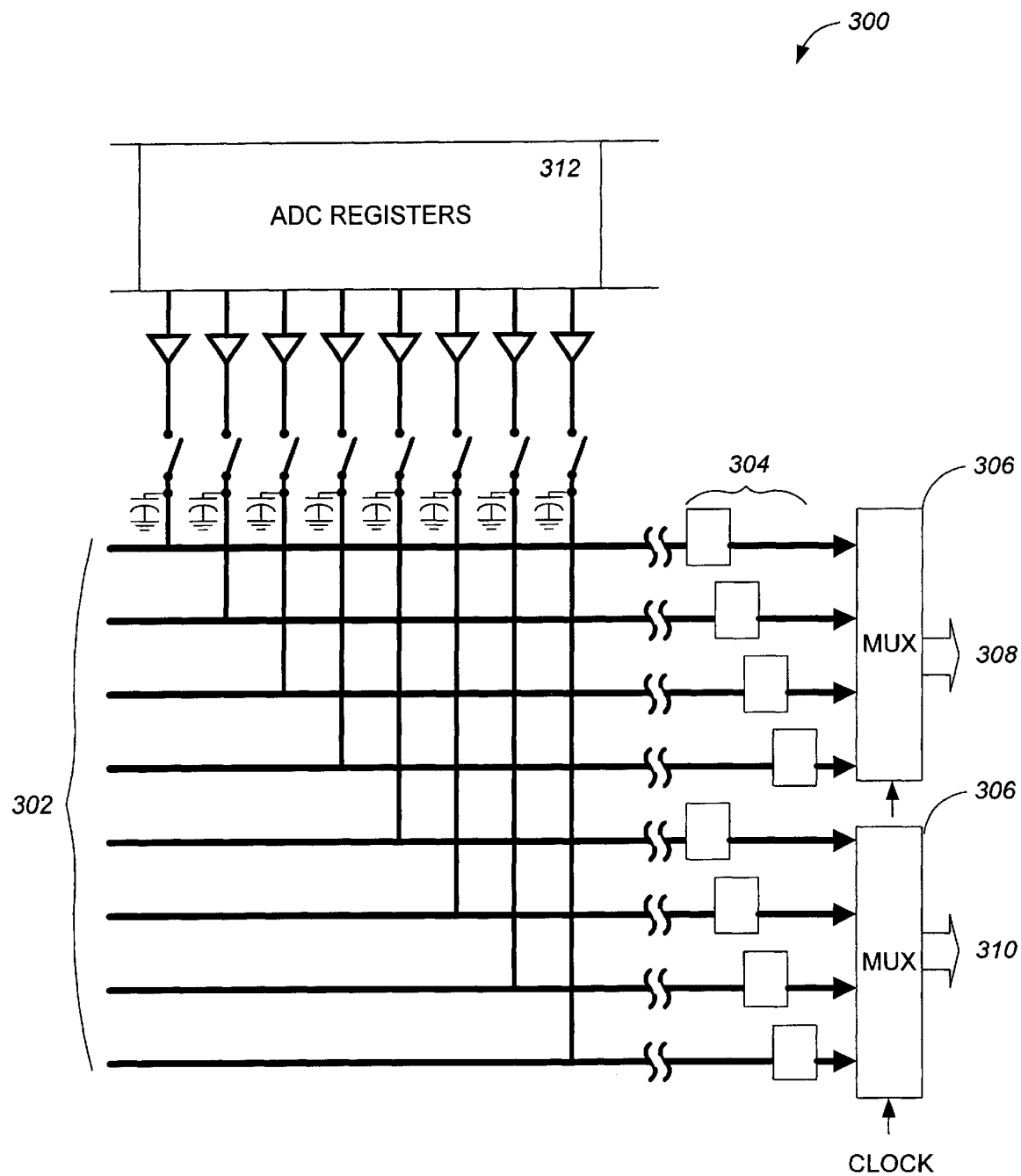
FIG. 3 is another aspect of the improved bus system.

FIG. 3. shows another aspect of the improved bus system 300. The bus system 300 has eight parallel bus lines 302 with eight registers 304 and two multiplexers 306. This configuration can increase the output readout rate by eight-fold and output the eight column-parallel pixel data in the ADC registers 312 at two output ports 308, 310.

Figure 4A:
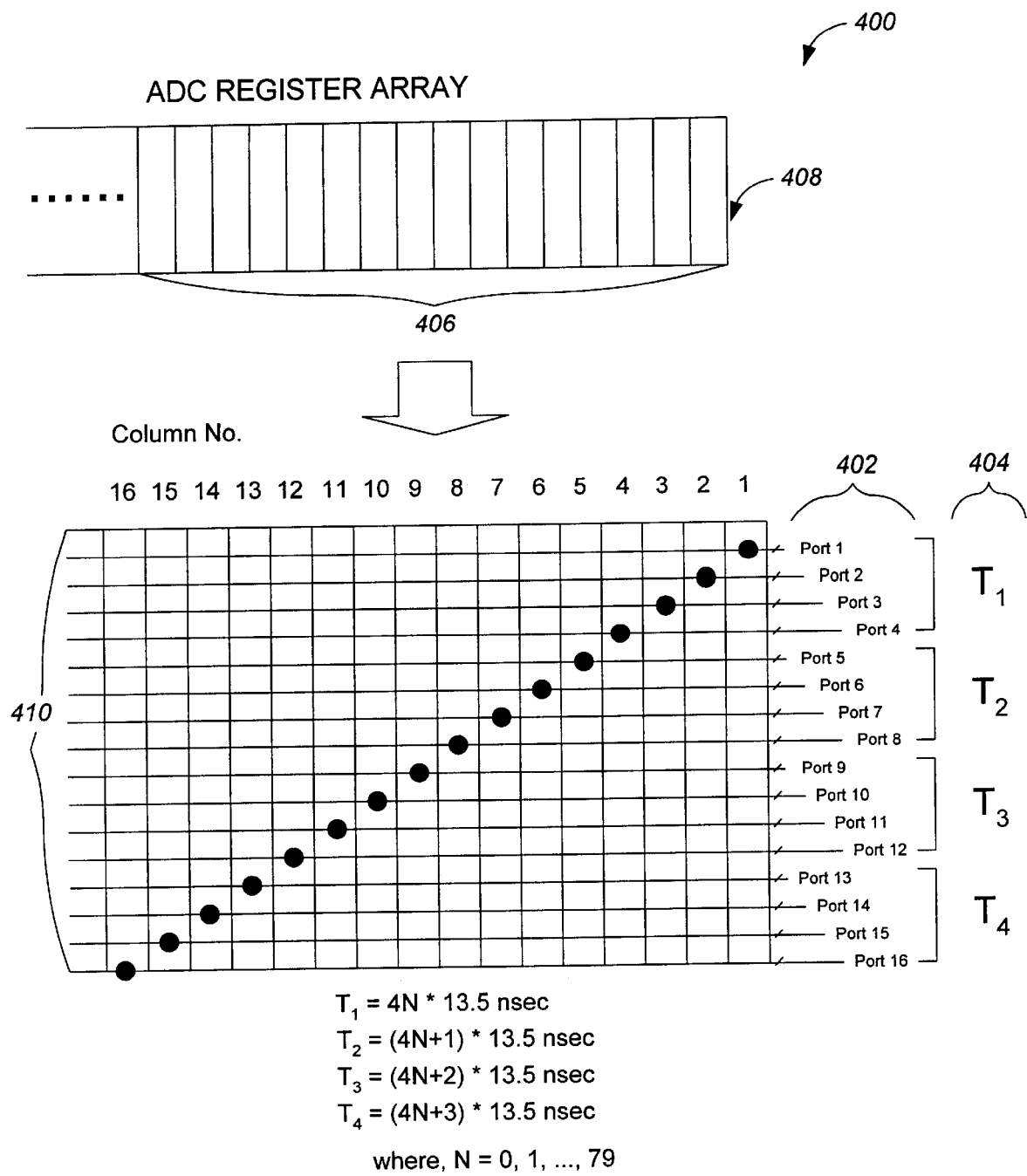
FIG. 4A is a preferred aspect of the improved bus system.

FIG. 4A shows a disclosed aspect of the improved bus system 400. This aspect is implemented in an APS image array with 1280 columns and 720 rows of pixels. The figure schematically illustrates the bus system 400 with sixteen parallel bus lines 410 that are time sequenced into four output ports at time intervals 404 of $T_x=[4N+(x-1)]*13.5$ nsec, where N is sequenced from 1 to 79 and x is sequenced from 1 to 4 for every N. The sixteen parallel bus lines 410 receive sensed signals from a group of 16-column pixels 406 in a row of pixels 408.

Each of the sixteen bus lines 410 is driven at 54 nanoseconds to place 18.56 Mpixels of data per second into its respective bus. Thus, each of the sixteen bus lines 410 holds one pixel data on the bus for 54 nanoseconds. The pixel data, placed on each of the sixteen bus lines 410 and available at each of the sixteen bus ports 402, are time sequenced 404 into each of the four output ports every 13.5 nanoseconds. The pixel data are multiplexed to four output ports in groups of four. Therefore, the pixel data are read out to the output ports at four times the speed of the internal bus or 74.25 Mpixels per second.

FIG. 4B shows a timing sequence of the multiplexed pixel data in a tabulate format. At time zero, the first group 412 of four bus ports (e.g., columns 1 through 4) is connected to the output ports A through D, respectively. The next group 414 (columns 5 through 8) is connected to the output ports at time 13.5 nanoseconds, and so on. The rest of the groups 416, 418 are output at times 27 nanoseconds and 40.5 nanoseconds.

After 54 nanoseconds, another sixteen pixel data from the next group of 16-column pixels 406 (e.g., columns 17 through 32) are placed on the bus lines 410. The pixel data are again time sequenced out to the four output ports in groups of four at times 54 nanoseconds 420, 67.5 nanoseconds, 81 nanoseconds and 94.5 nanoseconds. This process continues until all pixel data from a row of sensor array 408 are read out.

Figure 5A:
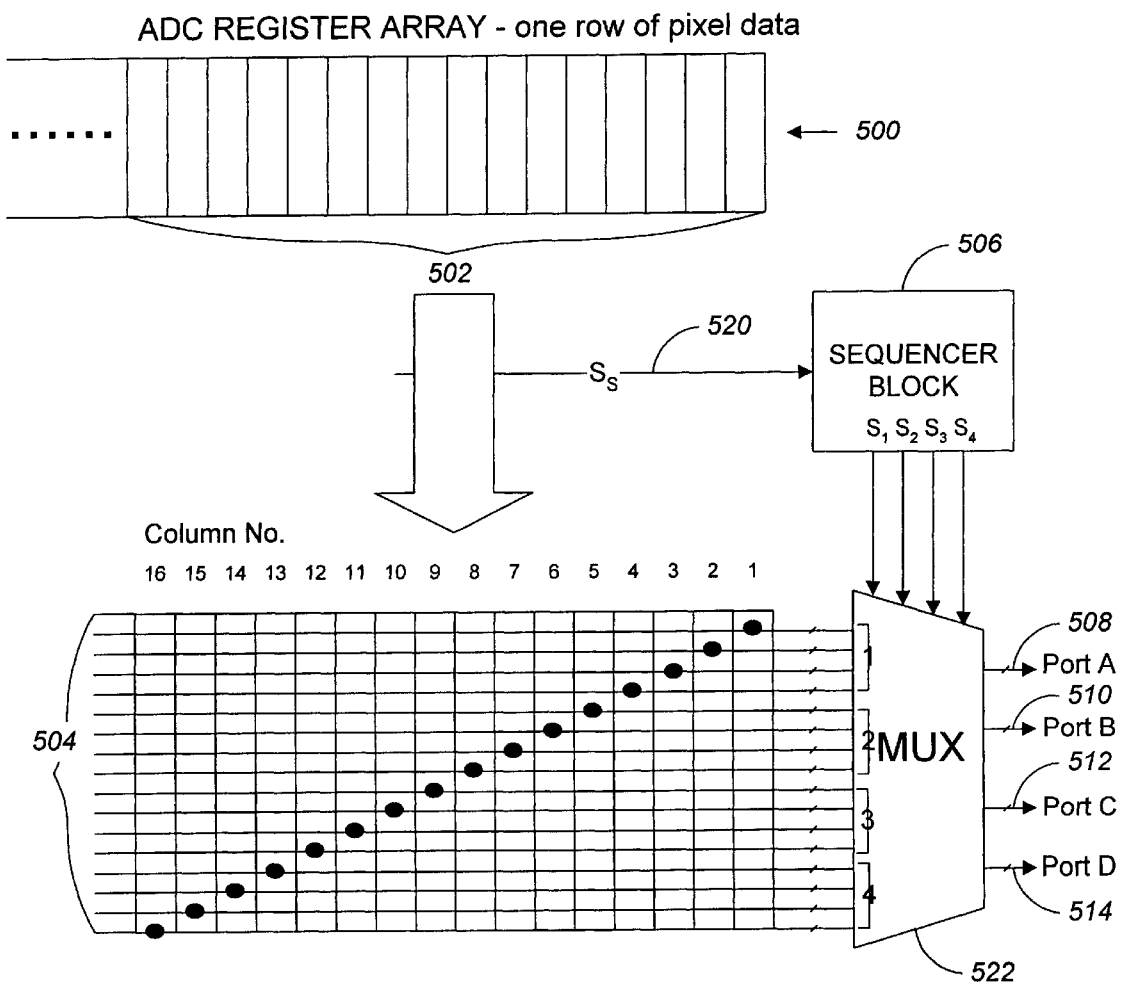
FIG. 5A is one implementation of the preferred aspect shown in FIG. 4A.

FIG. 5A shows one implementation of the preferred aspect 400 described above. The preferred aspect is implemented in an APS image array with 1280 columns and 720 rows of pixels. The data from an entire pixel row are converted to digital values and stored in 1280 registers of the ADC register array 500.

The pixel data from the APS image array is read out one row at a time with sixteen column-parallel pixel data 502 placed simultaneously on the sixteen bus lines 504. The pixel data placed on the sixteen bus lines 504 are time sequenced out by a sequencer block 506 to output ports A through D 508, 510, 512, 514.

The sequencer block 506 generates sequencing pulses $S_1$ through $S_4$. The sequencing pulses enable the multiplexer 522 to pass through the pixel data 502 placed on the sixteen bus lines 504 to the output ports 508, 510, 512, 514 in groups of four. Thus, the pulse $S_1$ enables the multiplexer 522 to pass the pixel data from a group of first four bus lines to the output ports 508, 510, 512, 514. The pulse $S_2$ enables the next four bus lines, and so on.

Figure 5B:
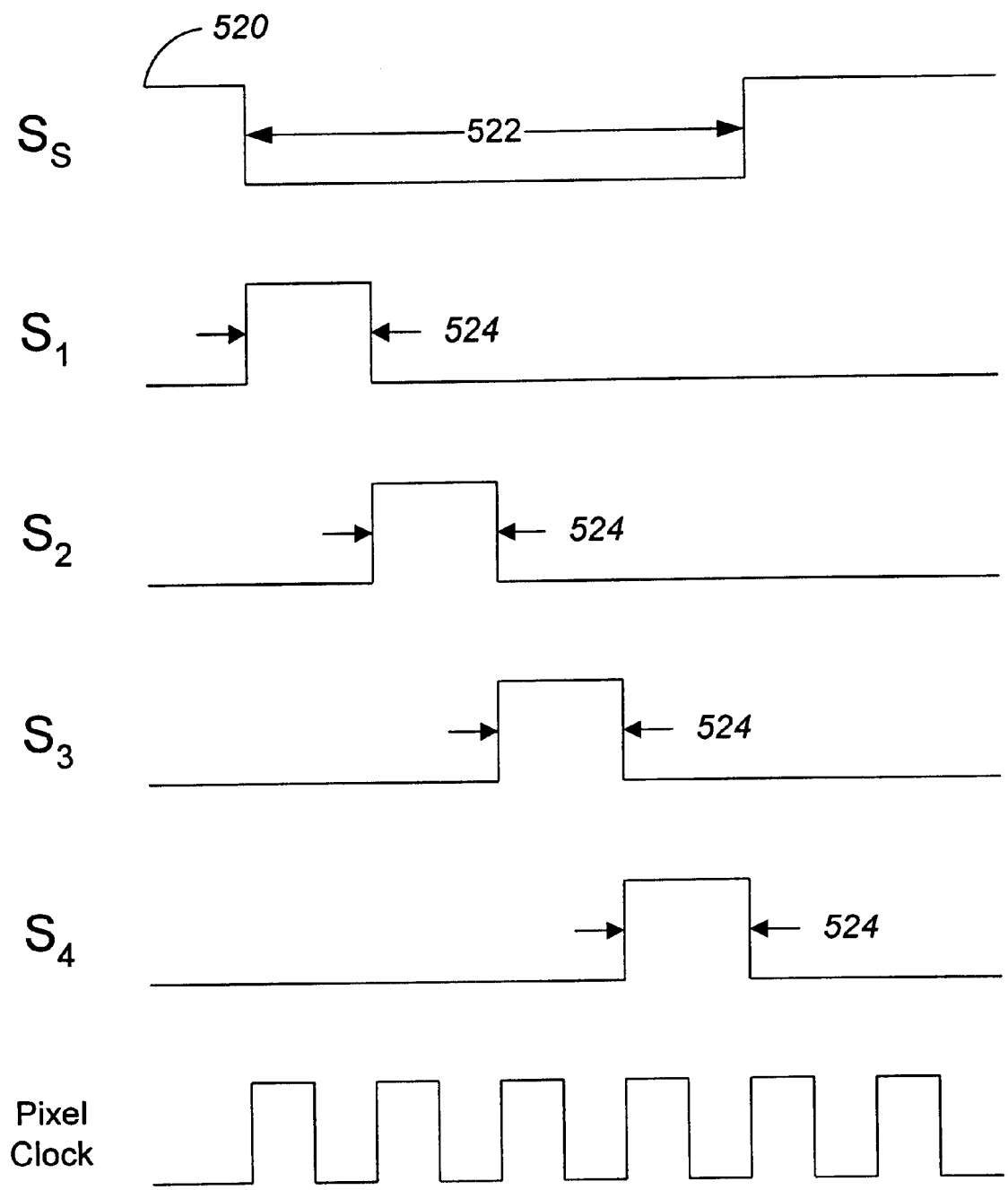
FIG. 5B is a timing diagram of the sequencer block shown in FIG. 5A.

FIG. 5B shows a timing diagram of the sequencer block 506. The diagram shows a pulse, $S_s$ 520, which is enabled by a trigger from the internal bus clock running at every 54 nanoseconds or 18.56 MHZ. The sequencing pulses $S_1$ through $S_4$ are 13.5 nanoseconds 524 (74.25 MHZ) long, and are triggered sequentially. The sequencing pulses allow the pixel data to be read out at multiple output ports at a high speed of 74.25 Mpixels per second.

Figure 6:
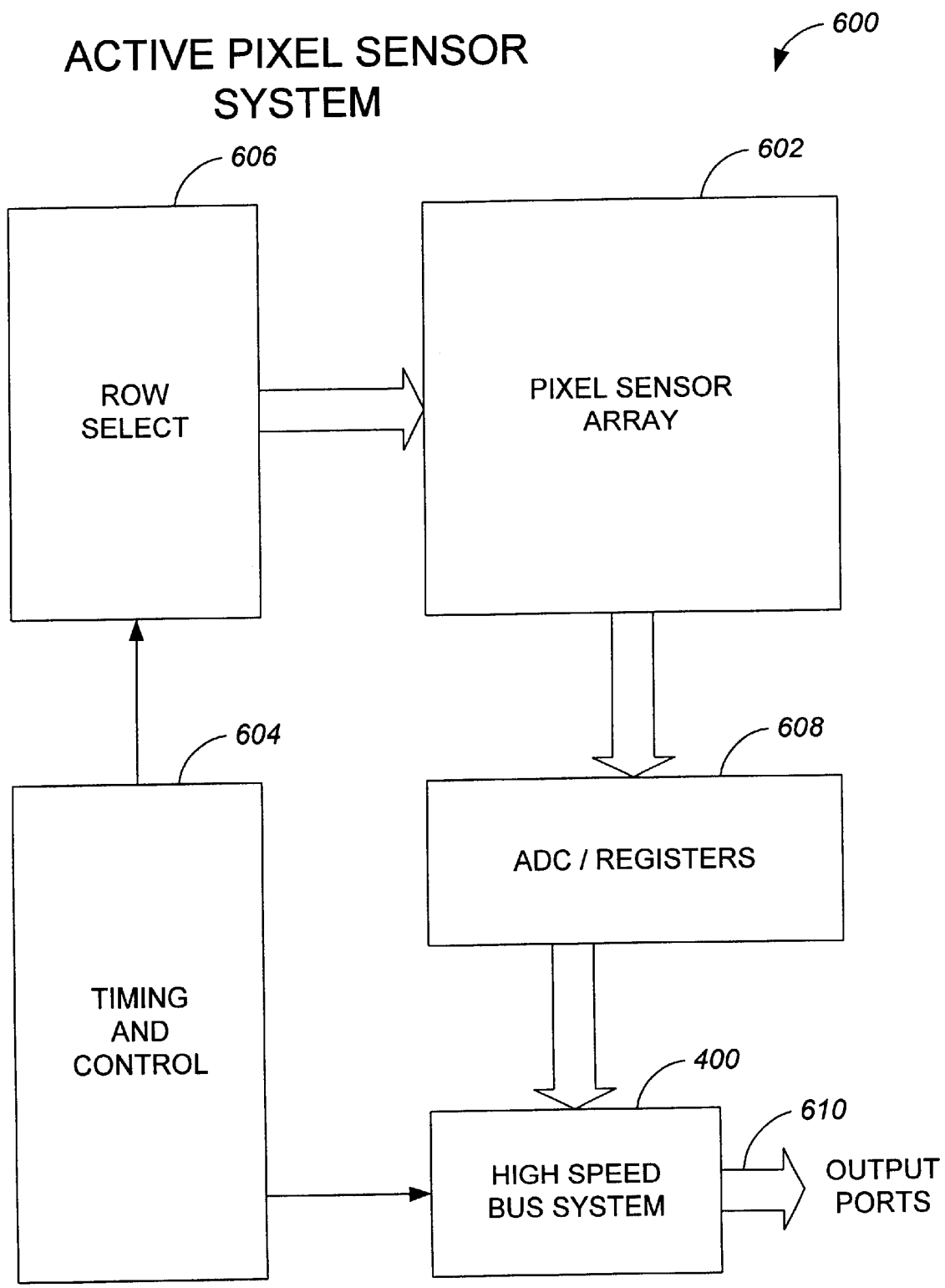
FIG. 6 is an APS system using the improved bus system shown in FIG. 4A.

FIG. 6 shows an APS system using the improved high-speed bus system 400. The APS system includes a pixel sensor array 602, a timing and control unit 604, a row-select element 606, an array of ADC registers 608, and the bus system 400. The timing and control unit 604 commands the row-select element 606 to select a row of the pixel sensor array 602 to read out to the output ports. A converter in the array of ADC registers 608 converts the collected charge to digital data and stores them in the register array. The digital pixel data are then-channeled to the output ports 610 through the bus lines in the high-speed bus system 400.

Figure 7:
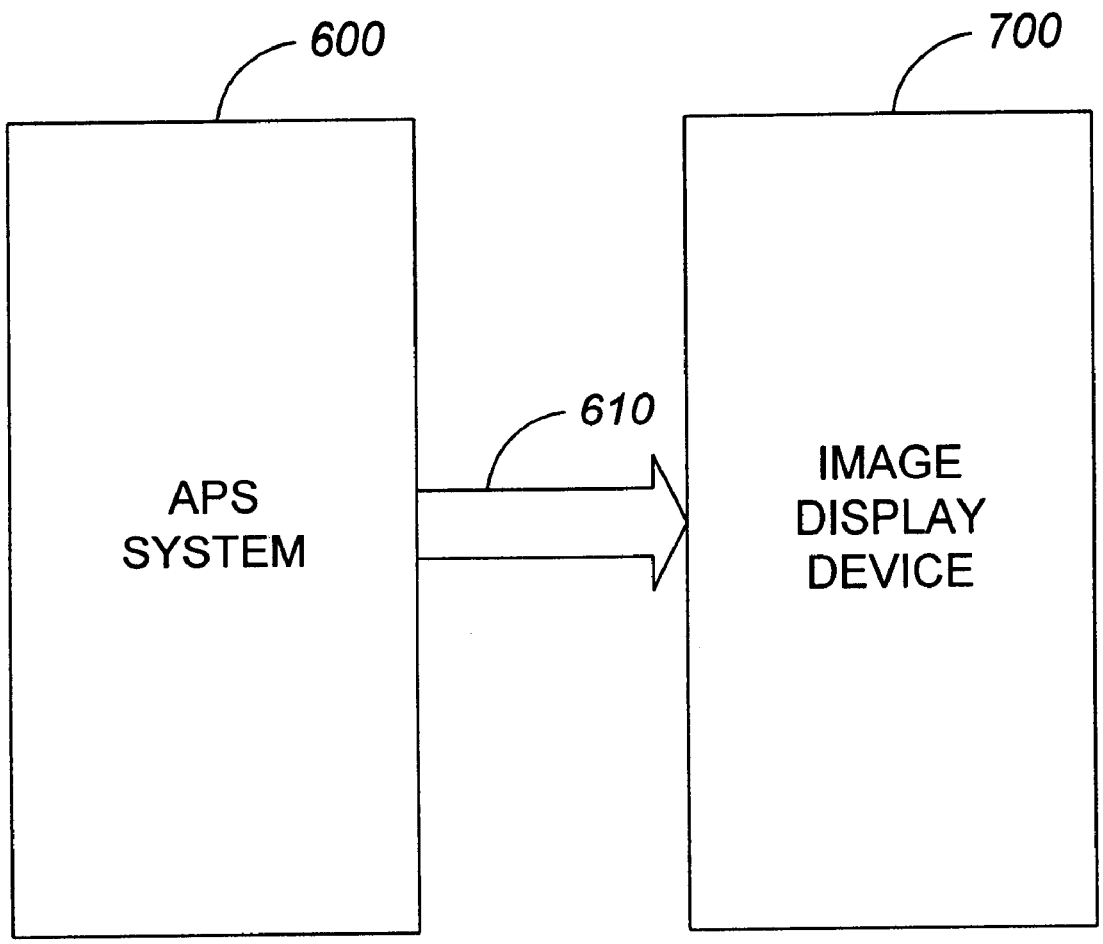
FIG. 7 is an APS camera system that includes the APS system shown in FIG. 6.

FIG. 7 shows an APS camera system that includes the APS system 600 described above. The camera system also includes an image display device 700. The image display device 700 displays the pixel data transported to the output ports 610 from the APS system 600 for viewing.

Figure 8:
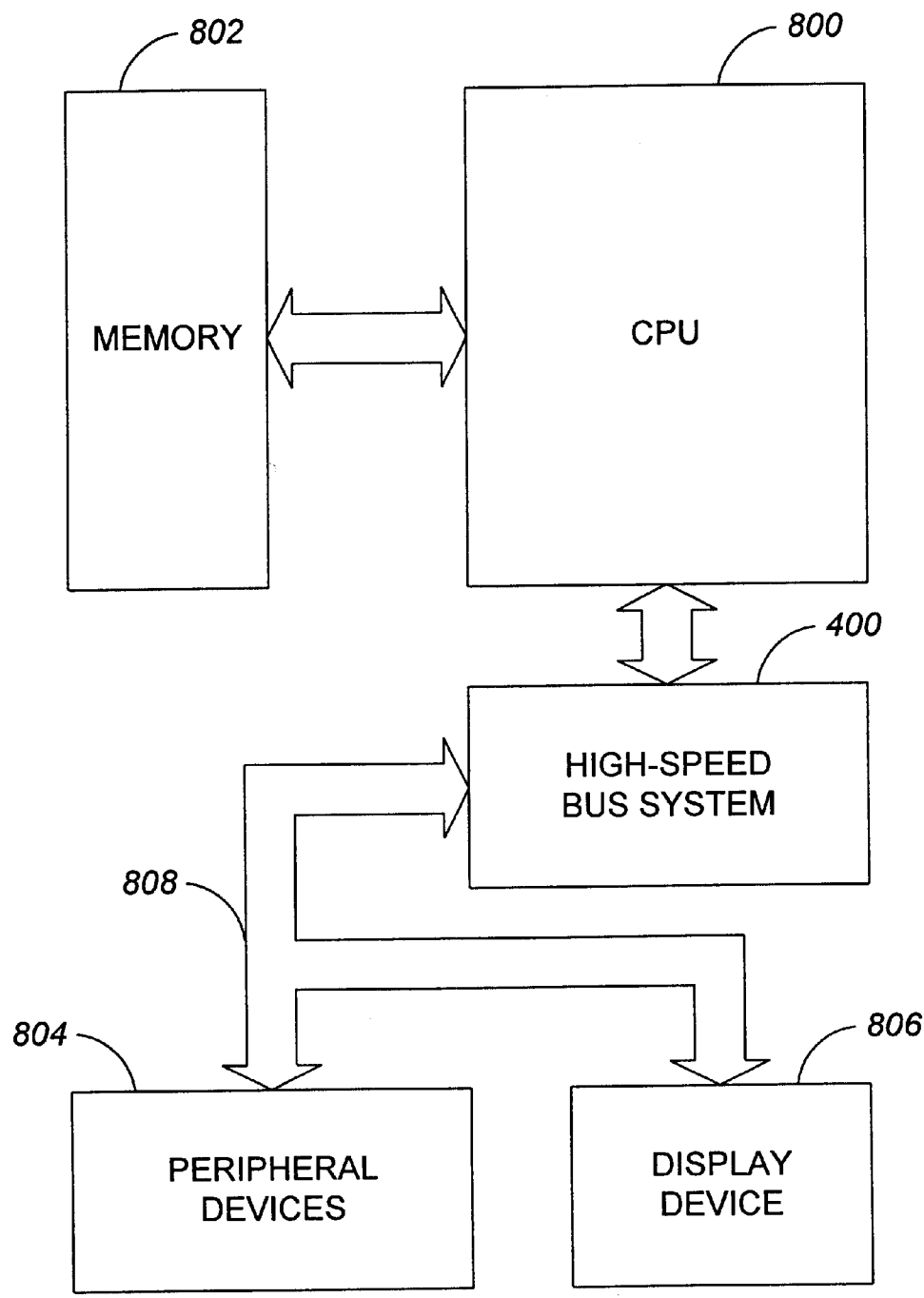
FIG. 8 is a microcomputer system that transfers its data through the improved bus system shown in FIG. 4A.

FIG. 8 shows a microcomputer system having a central processing unit (CPU) 800, a memory device 802, and peripheral devices 804, including a display device 806, which are connected to the improved bus system 400. The bus system 400 channels data from the CPU 800 to the peripheral devices 804 through the output ports 808. The digital data are channeled through the internal bus at relatively slow speed without any reduction in readout rate at the output ports 808.

Although only a few embodiments have been described in detail above, those of ordinary skill in the art certainly understand that modifications are possible. For example, even though the preferred aspect shows sixteen bus lines, the actual implementation can have any number of bus lines that reduces the effective internal bus speed without reducing the readout rate. In addition, the improved bus system can be used in applications other than the image sensors or the microcomputer system, such as in any data transfer system requiring high data readout rate with relatively slow internal bus. All such modifications are intended to be encompassed within the following claims, in which:

What is claimed is:

1. A system for transferring data from input ports to output ports, the system comprising:
   a plurality of bus lines connected for channeling data to the output ports;
   a plurality of switching elements configured to place data from the input ports onto the plurality of bus lines, each of the plurality of switching elements enabling a part of a group of data to be placed on each of the plurality of bus lines simultaneously; and
   a sequencing element coupled to the plurality of bus lines, the sequencing element configured to select a predetermined number of the group of data on the bus lines and to sequentially direct the selected number of data to the output ports at different points in time.

2. The system of claim 1, further comprising:
   a plurality of buffering elements coupled to the plurality of bus lines and the sequencing element, the buffering elements allowing the switching elements to place the next group of data onto the plurality of bus lines while the sequencing element is directing the previous group of data to the output ports.

3. The system of claim 1, wherein the plurality of switching elements includes a plurality of transistors configured to turn on or off in groups.

4. The system of claim 1, wherein there are eight bus lines channeling data from the input ports to the output ports.

5. The system of claim 4, wherein there are eight switching elements allowing eight data packets from the input ports to be placed simultaneously on the eight bus lines.

6. The system of claim 5, wherein the sequencing element includes two multiplexers, each multiplexer coupled to four of the eight bus lines and having an output port, each multiplexer configured to select a data on one of the four bus lines and to sequentially direct the selected data to the output port at different points in time.

7. The system of claim 1, wherein there are sixteen bus lines channeling data from the input ports to the output ports.

8. The system of claim 7, wherein there are sixteen switching elements allowing sixteen data packets from the input ports to be placed simultaneously on the sixteen bus lines.

9. The system of claim 8, wherein the sequencing element selects the data on four bus lines during one time slot to sequentially direct the selected data to the four output ports.

10. A bus system for transferring pixel data from storage devices of an image sensor array to output ports, the system comprising:
    bus lines for transporting pixel data to the output ports;
    a bus data clock for controlling the output rate of the pixel data to the bus lines;
    a number of switching mechanisms coupled to the bus lines and configured to place pixel data onto the bus lines at a particular time, where the timing of the switching mechanism is controlled by the bus data clock; and
    a sequencer block coupled to the bus lines and configured to be triggered by a pulse from the bus data clock, the sequencer block selecting the pixel data in groups and sequentially directing the pixel data to the output ports,
    such that all of the pixel data placed onto the bus lines at the particular time is readout at the output ports during the time the pulse from the bus data clock-is enabled.

11. The system of claim 10, further comprising:
    buffering elements coupled to the bus lines and the sequencer block, the buffering elements allowing the switching mechanisms to place the next group of pixel data onto the bus lines while the sequencer block is directing the previous group of pixel data to the output ports.

12. The system of claim 10, wherein the number of switching mechanisms includes a plurality of transistors configured to turn on or off in groups.

13. A method for transferring data from input ports to output ports, the method comprising:
    identifying parts of a group of data;
    transporting the parts of the group of data from the input ports and placing the parts of said group of data onto each of the bus lines simultaneously; and
    selecting a predetermined number of the parts of the group of data on the bus lines and sequentially directing the selected number of data to the output ports at different points in time.

14. A method for transferring data from-input ports to output ports, the method comprising:
    transporting a group of data from the input ports and placing each of said group of data onto bus lines simultaneously;
    channeling the group of data from the bus lines to the output ports;
    selecting a predetermined number of the group of data on the bus lines and sequentially directing the selected number of data to the output ports at different points in time; and
    buffering the selected number of data to allow the previous group of data to be directed to the output ports while the next group of data are placed onto the bus lines concurrently.

15. An active pixel sensor system having output ports, the system comprising:
    a pixel sensor array arranged in an array of rows and columns, the pixel sensor array configured to form an electrical representation of an image being sensed;
    a row-select element coupled to the pixel sensor array and configured to select a row of pixel sensors;
    an array of ADC registers to convert electrical charge sensed by the row of pixel sensors to digital pixel data and to store the data in the registers; and a bus system coupled to the array of ADC registers and configured to transfer pixel data from the array of ADC registers to the output ports.

16. The active pixel sensor system of claim 15, wherein the bus system includes:

a plurality of bus lines for channeling data to the output ports;

a plurality of switching elements configured to place data from the array of ADC registers onto the plurality of bus lines, each of the plurality of switching elements enabling one of a group of data to be placed on each of the plurality of bus lines simultaneously; and a sequencing element coupled to the plurality of bus lines, the sequencing element configured to select a predetermined number of the group of data on the bus lines and to sequentially direct the selected number of data to the output ports at different points in time.

17. The active pixel sensor system of claim 15, further comprising:

a timing and control unit coupled to the row-select element and the bus system, the control unit configured to generate timing and control signals that select appropriate pixel data and transfer the data to the output ports.

18. An APS camera system for converting an array of pixel data to a signal indicative of a visual image, the system comprising:

a pixel sensor array arranged in an array of rows and columns, the pixel sensor array configured to form an electrical representation of an image being sensed;

a row-select element coupled to the pixel sensor array and configured to select a row of pixel sensors;

an array of ADC registers to convert electrical charges sensed by the row of pixel sensors to digital pixel data and store the data in the registers;

a bus system coupled to the array of ADC registers and configured to transfer pixel data from the array of ADC registers to bus output ports; and an image display device coupled to the bus system and having a display screen, the image display device configured to transfer pixel data from the bus output ports, where the device arranges the pixel data in sequential order of rows to display the visual image on the display screen.

19. The APS camera system of claim 18, wherein the bus system includes:

a plurality of bus lines for channeling data to the bus output ports;

a plurality of switching elements configured to place data from the array of ADC registers onto the plurality of bus lines, each of the plurality of switching elements enabling one of a group of data to be placed on each of the plurality of bus lines simultaneously; and a sequencing element coupled to the plurality of bus lines, the sequencing element configured to select a predetermined number of the group of data on the bus lines and to sequentially direct the selected number of data to the bus output ports at different points in time.

20. The APS camera system of claim 18, further comprising:

a timing and control unit coupled to the row-select element and the bus system, the control unit configured to generate timing and control signals that select appropriate pixel data and transfer the data to the bus output ports.

21. A microcomputer system comprising:

a central processing unit configured to control and process various data;

a memory device coupled to the central processing unit and configured to supply the central processing unit with processing data;

a bus system coupled to the central processing unit and configured to transfer the processed data from the central processing unit to bus output ports;

peripheral devices coupled to the bus system and configured to transfer the processed data from the bus output ports to the devices for various different operations;

a plurality of bus lines for channeling data to the bus output ports;a plurality of switching elements configured to place the processed data from the central processing unit onto the plurality of bus lines, each of the plurality of switching elements enabling one of a group of data to be placed on each of the plurality of bus lines simultaneously; and a sequencing element coupled to the plurality of bus lines, the sequencing element configured to select a predetermined number of the group of data on the bus lines and to sequentially direct the selected number of data to the bus output ports at different points in time.

* * * * *